US005135822A

United States Patent [19]

Okamoto

[11] Patent Number: 5,135,822

[45] Date of Patent: Aug. 4, 1992

[54] BATTERY HOUSING STRUCTURE

[75] Inventor: Kazuhiko Okamoto, Nara, Japan

[73] Assignee: Sharp Kabushiki Kaisha, Japan

[21] Appl. No.: 745,075

[22] Filed: Aug. 15, 1991

[30] Foreign Application Priority Data

Aug. 30, 1990 [JP] Japan ................................ 2-228725

[51] Int. Cl.[5] ........................................ H01M 429/210

[52] U.S. Cl. ........................................ 429/97; 429/123

[58] Field of Search .................... 429/97, 98, 100, 123, 429/9, 121; 220/346; 206/333

[56] References Cited

U.S. PATENT DOCUMENTS 4,828,944 5/1989 Yabe et la. ............................ 429/97
4,880,712 11/1989 Gordecki ............................ 429/97

FOREIGN PATENT DOCUMENTS 56-69770 6/1981 Japan .
59-88868 6/1984 Japan .
62-43466 3/1987 Japan .
62-160459 10/1987 Japan .
62-160461 10/1987 Japan .
64-19256 1/1989 Japan .
64-40169 3/1989 Japan .
64-56142 4/1989 Japan .

*Primary Examiner*—Anthony Skapars
*Attorney, Agent, or Firm*—Nixon & Vanderhye

[57] ABSTRACT

A battery housing structure including a holding portion for holding a battery and a lid for covering the holding portion, the holding portion being arranged on a case of an electronic device, includes a sliding member for slidably moving between a first position and a second position, and a blocking member for preventing the lid from being mounted on the case when the tip of the sliding member is located at the second position. The first position corresponds to a position where a tip of the sliding member comes into contact with the battery when the battery is held on the holding portion, and the second position corresponds to a position where the tip of the sliding member stops when the battery is not held on the holding portion.

9 Claims, 8 Drawing Sheets

BATTERY HOUSING STRUCTURE

BACKGROUND OF THE INVENTION

1. Field of the Invention

The present invention relates to a battery housing structure which is used for an electronic device driven by a button-type battery.

2. Description of the Related Art

There have been commercially provided a number of portable electronic devices such as an electronic note driven by one of more button-type batteries. Hereinafter, the term "battery" means a button-type battery. Such an electronic device normally has a battery housing structure in itself.

A battery housing structure known by the present inventor will be described below.

On a case of the electronic device are arranged a first battery holding portion for holding a first main battery, a second battery holding portion for holding a second main battery, and a third battery holding portion for holding a back-up battery. The first and second main batteries are served as a main power source of an internal circuit included in the case of the electronic device. The back-up battery is served as an auxiliary power source.

The first and second battery holding portions for holding the main batteries are independent of the third battery holding portion for holding the back-up battery so that the main batteries can be held or picked out independently of the back-up battery. It means that both the main batteries and the back-up battery are allowed to be removed from the first and second battery holding portions and the third battery holding portion, respectively.

The first and second battery holding portions include a first terminal and a second terminal, respectively. The first and second terminals are respectively coupled to each one terminal of the first and second main batteries.

The first and second main batteries are repectively held in the first and second holding portions so that each one terminal of the first and second main batteries is coupled to the corresponding first or second terminal. The opposite terminals of the first and second main batteries are pressed by a first lid, and the first lid is fixed on the case by using a vis.

The first lid is compossed of a conductive material so that the first lid serves as connecting the first and second main batteries with each other.

The third battery holding portion for holding the back-up battery has a circular concave portion for holding the back-up battery. Around the concave portion are formed a first through hole and a second through hole. The first and second through holes are opposite to each other with respect to the concave portion.

A circular lid, that is, a second lid is formed to mate to the concave portion. On the periphery of the second lid are formed a first fixing pawl and a second fixing pawl. The first and second fixing pawls are respectively fixed to the first and second through holes by moving the pawls in the peripheral direction.

The second lid has a groove to be engaged with a coin or a minus driver. With the coin or minus driver being fitted in the groove, the second lid is rotated so that the back-up battery and the second lid are fixed on the case.

In exchanging the first and second main batteries and the back-up battery, however, the known battery housing structure as described above requires the annoying steps of temporarily removing the vis and the first and second lids from the case, mounting new first and second main batteries and new back-up battery on the corresponding battery holding portions, and then mounting the first lid, the vis, and the second lid on the case. Further, this battery housing structure makes it possible for a user to inadvertently mount the first lid, the vis and the second lid on the case, even in case the first and second main batteries and the back-up battery are not mounted.

As another disadvantageous matter, the first and second battery holding portions are formed independently of the third battery holding portion for holding back-up battery. Hence, the first and second main batteries and the back-up battery may be removed at a time, resulting in increasing the possibility of losing the data stored in an internal memory of the electronic device.

SUMMARY OF THE INVENTION

It is therefore a first object of the present invention to provide a battery housing structure which makes it possible to mount a lid on a case only if a battery is mounted.

It is a second object of the present invention to provide a battery housing structure which makes it possible for a user to easily exchange an old battery with a new one.

It is a third object of the present invention to provide a battery housing structure which prevent the main battery and the back-up battery from being removed at one time.

The first object of the invention can be achieved by a battery housing structure including a holding portion for holding a battery and a lid for covering the holding portion, the holding portion being arranged on a case of an electronic device, including:

a sliding member for slidably moving between a first position and a section position; and a blocking member for preventing the lid from being mounted on the case when the tip of the sliding member is located at the second position. The first position corresponds to a position where a tip of the sliding member comes into contact with the battery when the battery is held on the holding portion and the second position corresponds to a position where the tip of the sliding member stops when the battery is not held on the holding portion.

The second object of the invention can be achieved by a battery housing structure including a holding portion for holding a battery and a lid for covering the holding portion, the holding portion being arranged on a case of an electronic device, including:

a sliding member for slidably moving between a first position and a second position; and a blocking member for preventing the lid from being mounted on the case when the tip of the sliding member is located at the second position. The first position corresponds to a position where a tip of the sliding member comes into contact with the battery when the battery is held on the holding portion and the second position corresponds to a position where the tip of the sliding member stops when the battery is not held on the holding portion. The lid includes two or more locking members capable of being inserted into through holes provided on the case, and the lid is formed to slidably move between the first position and a third position. The third position is located between the first and second position and where the tip of the sliding member comes into contact with the battery when the battery is held on the holding portion. The locking members are formed to be locked in the through holes when the lid is located at the first position and to be released from the through holes when the lid is located at the third position.

The third object of the invention can be achieved by a battery housing structure having first and second battery housing structure unit, each of the units including a holding portion for holding a battery and a lid for covering the holding portion, the holding portion being arranged on a case of an electronic device, including:

a sliding member for slidably moving between a first position and a second position;

a blocking member for preventing the lid from being mounted on the case when the tip of the sliding member is located at the second position; and a switching member for slidably moving in the direction perpendicular to both of the sliding members in the first and second units, the switching member being formed to block a removal of the lid of the first unit when the battery is not held in the second holding portion in the second unit. The first position corresponds to a position where a tip of the sliding member comes into contact with the battery when the battery is held on the holding portion and the second position corresponds to a position where the tip of the sliding member stops when the battery is not held on the holding portion.

In the operation of the first aspect of the invention, when the tip of the sliding member is located at the second position where the tip is stopped if the battery is not held on the holding portion, the blocking member serves to prevent the lid from being mounted on the case of the electronic device. It results in making it possible for a user to mount the lid on the case only if the battery is mounted.

In the operation of the second aspect of the invention, when the lid is located at the first position, that is, the tip of the sliding member comes into contact with the battery held on the holding portion, the locking members are locked in the through hole. When the lid is moved from the first position to the third position between the first and the second positions, that is, the tip of the sliding member comes into contact with the battery held on the holding portion, the locking members are released from the through hole so that the lid is allowed to be mounted or removed only by sliding the lid. It results in achieving the easy exchange of the battery.

In the operation of the third aspect of the invention, the switching member serves to remove the lid for one of the battery only if the other battery is held on the holding portion. It results in preventing both the batteries held in the battery housing structure units from being removed at a time.

Further objects and advantages of the present invention will be apparent from the following description of the preferred embodiments of the invention as illustrated in the accompanying drawings.

BRIEF DESCRIPTION OF THE DRAWINGS

FIG. 8 is perspective view showing the construction of an electronic device which has the battery housing structure built-in.

DESCRIPTION OF THE PREFERRED EMBODIMENTS

Herein, the embodiments of the invention will be described with reference to the drawings.

Figure 1:
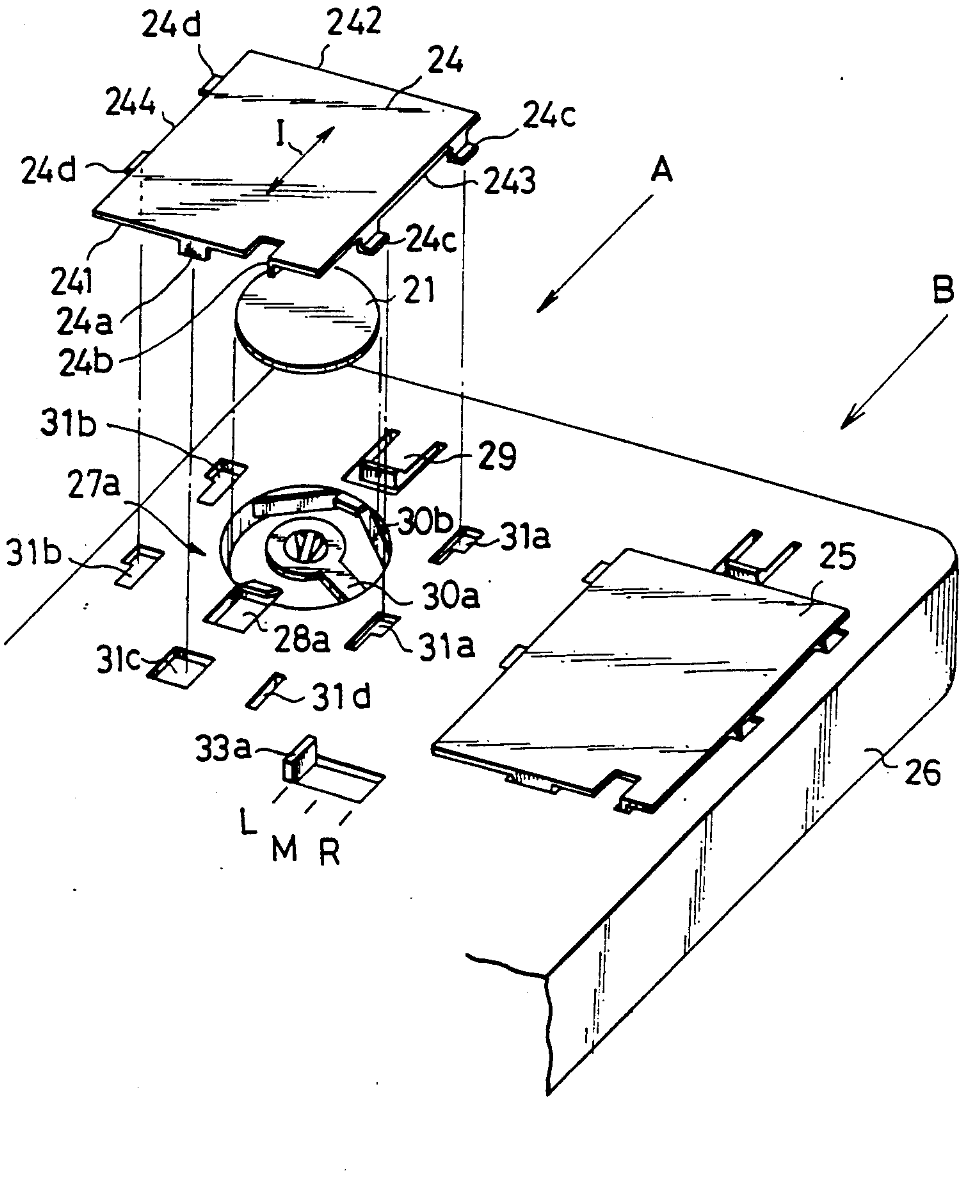
FIG. 1 is a perspective view showing a battery housing structure according to an embodiment of the present invention.

FIG. 1 is a perspective view showing a battery housing structure according to an embodiment of the invention.

As shown in FIG. 1, a lid 24 is removed from a main battery housing portion A (to be described later) and a lid 25 is mounted on a back-up battery housing portion B.

This battery housing structure is roughly divided into two parts, that is, the main battery housing portion A for holding a main battery 21 which drives an electronic device and the back-up battery housing portion B for holding a back-up battery (not shown).

The main battery housing portion A has the fundamentally same structure as the back-up battery housing portion B. Hence, only the structure of main battery housing portion A will be described later.

The lid 24 of the main battery housing portion A is formed with square and tabular and has four ends 241 to 244.

The end 241 has a locking piece **24*a* formed downward in the direction perpendicular to the plane of the lid 24. A locking piece 24*b* is also formed downward in the direction perpendicular to the plane of the lid 24. The locking piece 24*a* is located in a twisted manner to the locking piece 24*b***.

The locking piece **24*a* allows a sliding member 28*a* for sensing the mounted battery to be slid between the position where the main battery 21 is held and the position where the lid 24 is mounted. The locking piece 24*b* allows the lid 24 to be mounted to a case 26** of the electronic device.

The ends 243 and 244 extend perpendicularly to the end 241 and in parallel to each other. Those ends 243 and 244 respectively have for example two L-form locking pieces **24*c* and 24*d* which is formed downward for locking the lid 24 to the case 26**.

The case 26 has a concave portion **27*a* for holding the main battery, the sliding member 28*a* for sensing the mounted battery, and a locking pawl 29**.

The tip of the sliding member **28*a* is allowed to come into contact with the side of the main battery to be mounted in the concave portion 27*a***.

The locking pawl 29 is located in opposite to the sliding member **28*a* with the concave portion 27*a* being located therebetween. The locking pawl 29** comes into contact with the end 242 and is vertically flexed so that the locking pawl 29 can lock the lid 24.

Within the concave portion 27*a* are provided terminals 30*a* and 30*b*. The terminals 30*a* and 30*b* can respectively be connected to a positive terminal and a negative terminal of the main battery 21 and serves to hold the main battery 21 between themselves.

Around the concave portion 27*a* are formed through holes 31*a*, 31*b*, 31*c* and 31*d*.

The through holes 31*a* and 31*b* are formed to vertically lock the locking pieces 24*c* and 24*d*, respectively. The through holes 31*a* and 31*b* are formed like an L character so that the locking pieces 24*c* and 24*d* are allowed to be detachably locked in the longitudinal direction of the ends 243 and 244, that is, in the lid-slidable direction I.

The through holes 31*c* and 31*d* are large enough to receive the locking pieces 24*a* and 24*b* along the lid-slidable direction I.

Figure 2:
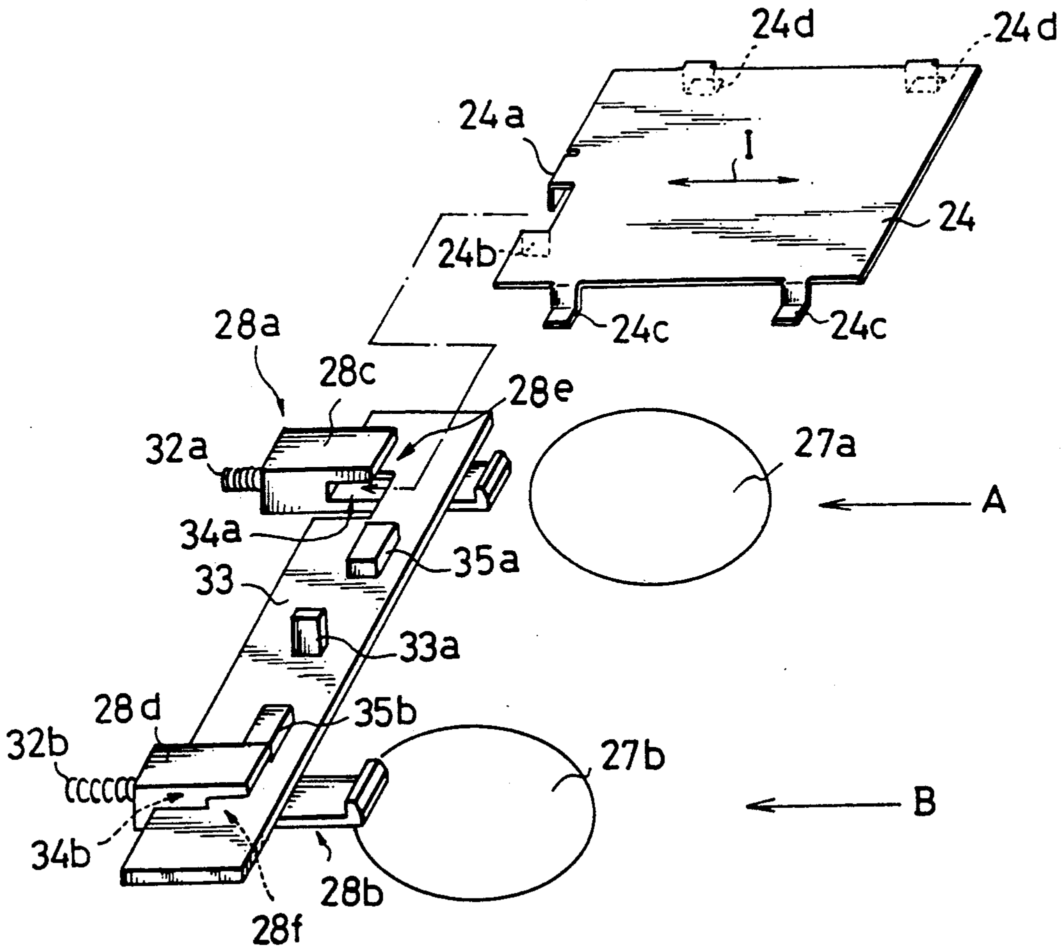
FIG. 2 is a perspective view showing an essential portion of the lid-mounting structure.

FIG. 2 is a perspective view showing an essential portion of the lid-mounting structure.

As shown in FIG. 2, the sliding member 28*a* for sensing the mounted battery for the main battery housing portion A and a sliding member 28*b* for sensing the back-up battery for the back-up battery housing portion B are respectively pushed by springs 32*a* and 32*b* toward the concave portions 27*a* and 27*b*. The sliding members 28*a* and 28*b* respectively and tips formed like a hook directed upward. The tips of the sliding members 28*a* and 28*b* respectively come into contact with the main battery and the back-up battery when the main battery and the back-up battery are mounted.

The sliding members 28*a* and 28*b* respectively have upper walls 28*c* and 28*d*. The upper walls 28*c* and 28*d* respectively have concaves 28*e* and 28*f* inside of them.

The concaves 28*e* and 28*f* receive a switching member 33. The switching member 33 is allowed to be slid in the direction perpendicular to the sliding direction I of the sliding members 28*a* and 28*b* for sensing the mounted battery.

There are formed on the top of the switching member 33 a switching knob 33*a*, and projections 35*a* and 35*b*. Square cut-away portions 34*a* and 34*b* are formed on the switching member 33.

The switching knob 33*a* is arranged between the projections 35*a* and 35*b*, and has three positions "L", "M" and "R" (to be described later).

The cut-away portions 34*a* and 34*b* are formed to be engaged with the concaves 28*e* and 28*f*, respectively.

The projections 35*a* and 35*b* are formed to be respectively locked to the locking piece 24*b* of the lid 24 for the main battery housing portion A and the locking piece of the lid (not shown) for the back-up battery housing portion B.

Figure 3:
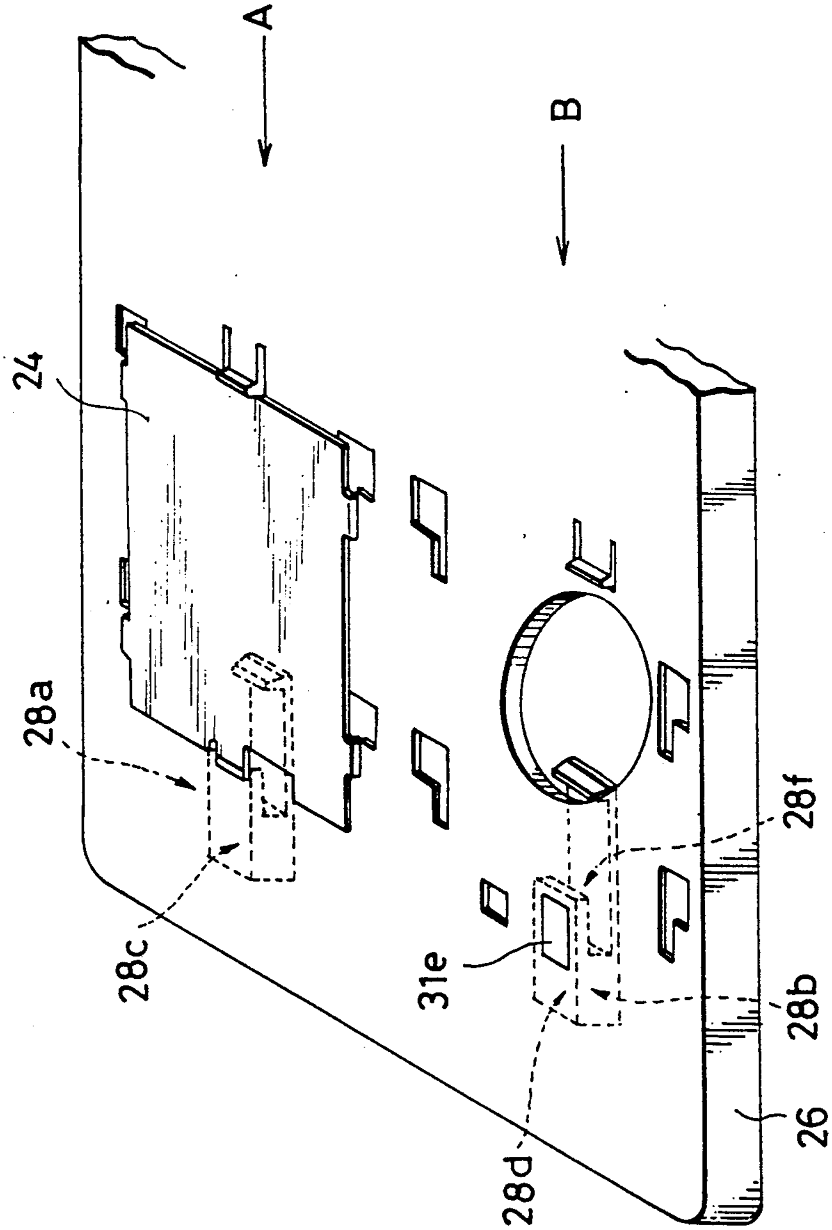
FIG. 3 is a perspective view showing a lid of a main battery housing portion A is mounted and a lid of a back-up battery housing portion B is removed.

FIG. 3 is a perspective view showing that the lid 24 of the main battery housing portion A is mounted and the lid of the back-up battery housing portion B is removed.

As will be apparent from the back-up battery housing portion B shown in FIG. 3, the upper wall 28*d* of the sliding member 28*b* is allowed to be slid along a through hole 31*e* of the case 26. The upper wall 28*d* serves to block the overall through hole 31*e* if the back-up battery (not shown) is not mounted. Thus, when the sliding member 28*b* is located at the position where no back-up battery is mounted, the upper wall 28*d* serves to block the overall through hole 31*e* so that the locking piece of the lid 25 (corresponding to the locking piece 24*a* of the lid 24 shown in FIGS. 1 and 2) is disallowed to be inserted into the through hole 31*e*.

Since the main battery housing portion A has the fundamentally same structure as the back-up battery housing portion B, the lid is disallowed to be mounted in the main battery housing portion A and the back-up battery housing portion B if no battery is mounted. It results in making it possible to mount the lid only if the battery is mounted.

Figures 4A, 4B, 4C:
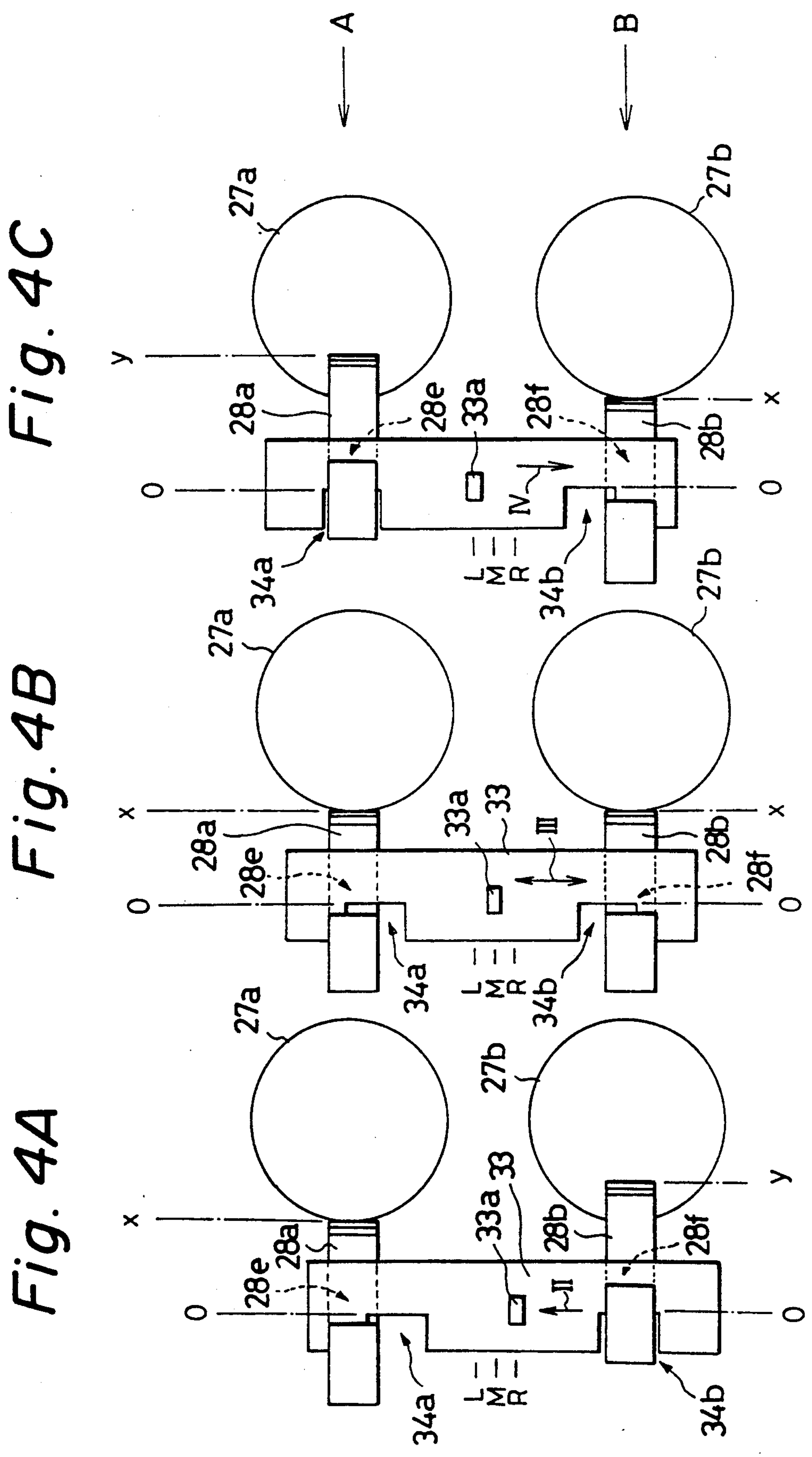
FIGS. 4A to 4C are explanatory views showing the positional relation between sliding members for sensing a mounted battery and a switching member included in the battery housing structure shown in FIG. 2.

FIGS. 4A, 4B and 4C are explanatory views showing the positional relation among the sliding members 28*a* and 28*b* for sensing the mounted battery and the switching member 33 shown in FIG. 2.

As shown in FIGS. 4A, 4B and 4C, a reference symbol O denotes a reference position of one of the edges of the cut-away portions 34*a* and 34*b* along the longitudinal direction of the switching member 33. A reference symbol x denotes the position of the tips (the lid-mounted position) where the tips of the sliding members 28*a* and 28*b* respectively come into contact with the batteries when the lids are mounted on the case and the batteries are mounted in the concave portions. A reference symbol y denotes the position of the tips (battery-empty position) where the tips of the sliding members 28*a* and 28*b* are stopped when the battery is not mounted on the concave portion.

FIG. 4A shows the state where the lid of the back-up battery housing portion B and the back-up battery are removed by moving the switching knob 33*a* to the position "R" for exchanging the back-up battery when the main battery and the back-up battery are respectively mounted on the main battery housing portion A and the back-up battery housing portion B and when the corresponding lids are mounted on the case.

As shown in FIG. 4A, the tip of the sliding member 28*a* is located at the lid-mounted position x and the tip of the sliding member 28*b* is located at the battery-empty position y. In this state, the concave 28*e* of the sliding member 28*a* for sensing the mounted battery contained in the main battery housing portion A is not engaged with the cut-away portion 34*a* of the switching member 33, and the concave 28*f* of the back-up battery housing portion B is engaged with the cut-away portion 34*b*. Hence, the switching member 33 is disallowed to be slid in the direction II perpendicular to the sliding members 28*a* and 28*b*.

FIG. 4B shows the state following the state shown in FIG. 4A, that is, where a new back-up battery is mounted and the lid is mounted on the case.

As shown in FIG. 4B, the tips of the sliding members 28*a* and 28*b* are both located at the lid-mounted position x. The concaves 28*e* and 28*f* contained in the main battery housing portion A and the back-up battery housing portion B are not respectively engaged with the cut-away portions 34*a* and 34*b* of the switching member 33. Hence, the switching member 33 is allowed to be slid in the direction III perpendicular to the sliding members 28*a* and 28*b*.

It is also possible to take such construction as turning on a power switch of the electronic device when the switching knob 33*a* is set to the position "M".

FIG. 4C shows the state following the state shown in FIG. 4C, that is, where the lid of the main battery housing portion A and the main battery are removed for exchanging the main battery by moving the switching knob 33*a* to the position "L" when the main battery is mounted on the main battery housing portion A and the back-up battery is mounted on the back-up battery housing portion B.

As shown in FIG. 4C, the tip of the sliding member 28*a* is located by the battery-empty position y and the tip of the sliding member 28*b* is located by the lid-mounted position x. In this state, the concave 28*f* of the back-up battery housing portion B is not engaged with the cut-away portion 34*b* but the concave 28*e* of the main battery housing portion A is engaged with the cut-away portion 34*a*. Hence, the switching member 33 is disallowed to be slid in the direction IV perpendicular to the sliding members 28*a* and 28*b*.

FIGS. 5A to 5D are perspective views showing the detail of the positional relation between the sliding member 28*a* for sensing the mounted battery and the switching member 33. FIGS. 6A to 6D are explanatory views showing the detail of the lid-mounting structure.

As shown in FIGS. 5A to 5D, a reference symbol O denotes a reference position of one of the edges of the cut-away portions 34*a* and 34*b* along the longitudinal direction of the switching member 33. A reference symbol x denotes the position of the tips (lid-mounted position) where the tips of the sliding members 28*a* and 28*b* for sensing the mounted battery respectively come into contact with the batteries when the lids are mounted on the case and the batteries are mounted on the concave portions. A reference symbol y denotes the position of the tips (battery-empty position) where the tips of the sliding members 28*a* and 28*b* are stopped when the lid is not mounted on the case and the battery is not mounted on the concave portion. A reference symbol z denotes the position of the tips (battery-mounted position) where the tips of the sliding members 28*a* and 28*b* come into contact with the battery when the lid is not mounted on the case and the battery is mounted on the concave portion.

With reference to FIGS. 5A to 5D and FIGS. 6A to 6D, the description will be directed to the detail construction of the locking pieces formed on the lid of the main battery housing portion A, the through holes formed on the case, and each member included in the sliding member 28*a* for sensing the mounted battery.

Figure 5A:
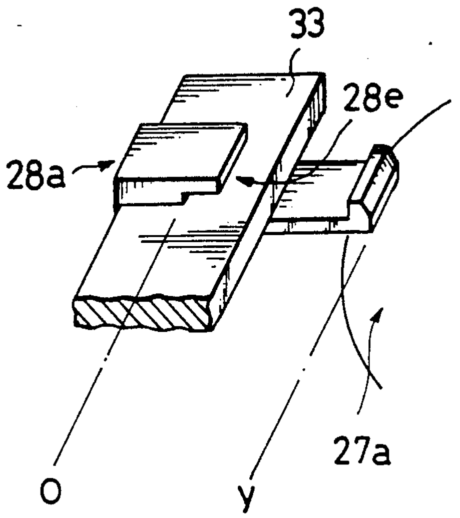
FIGS. 5A to 5D are perspective views showing the detail of the positional relation between the sliding members for sensing a mounted battery and the switching member.

As shown in FIG. 5A, the tip of the sliding member 28*a* is located at the battery-empty position y. When the main battery (not shown) is not mounted on the concave portion 27*a* of the main battery housing portion A, as shown in FIG. 4C, the concave 28*e* of the sliding member 28*a* is engaged with the cut-away portion (not shown but corresponding to the cut-away portion 34*a* shown in FIG. 2) of the switching member 33 so that the switching member 33 is not allowed to be slid.

Figure 6A:
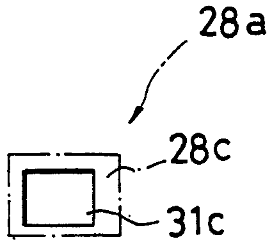
FIGS. 6A to 6D are explanatory views showing how the lid is mounted in some detail.

As shown in FIG. 6A, the upper wall 28*c* of the sliding member 28*a* serves to block the overall through hole 31*c* (see FIG. 1). The locking piece (not shown but corresponding to the locking piece 24*a* shown in FIG. 1) formed on the lid of the concave portion 27*a* is disallowed to be inserted into the through hole 31*c*.

Figure 5B:
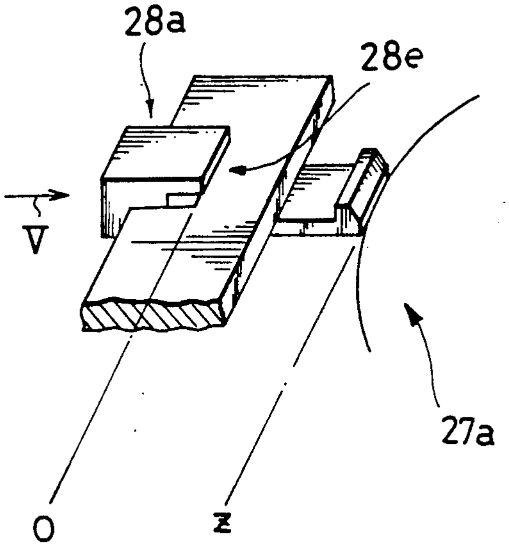

Turning to FIG. 5B, when the main battery is mounted on the concave portion 27*a*, the sliding member 28*a* comes into contact with the side of the main battery and slides against the force of a spring (not shown) exerted in the direction V. The tip of the sliding member 28*a* results in being located at the battery-mounted position z.

At this time, the concave 28*e* of the sliding member 28*a* keeps being engaged with the cut-away portion (not shown but corresponding to the cut-away portion 34*a* shown in FIG. 2) of the switching member 33. Hence, the switching member 33 is not allowed to be slid.

Figure 6B:
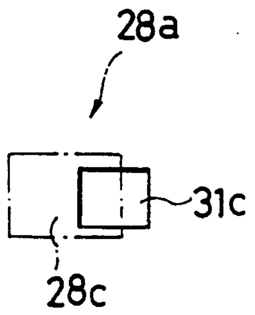

As shown in FIG. 6B, the upper wall 28*c* of the sliding member 28*a* serves to block almost half of the through hole 31*c*. Hence, the locking piece (not shown but corresponding to the locking piece 24*a* shown in FIG. 1) formed on the lid of the concave portion 27*a* is allowed to be inserted into the through hole 31*c* so that the lid is mounted on the case.

That is, unless the main battery is mounted on the concave portion 27*a*, the lid of the concave portion 27*a* is not allowed to be mounted on the case. It results in making it possible to mount the lid on the case only if the battery is mounted on the concave portion.

Figure 7A:
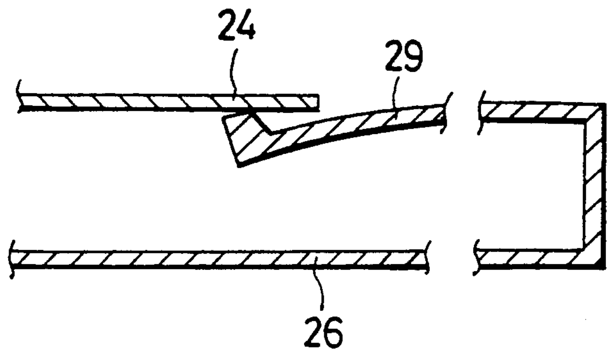
FIGS. 7A and 7B are sectional views showing the positional relation between a lid and a fixing pawl.
Figure 7B:
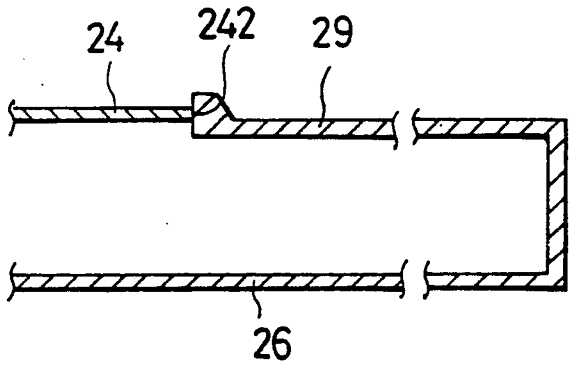

FIGS. 7A and 7B are sectional views showing the positional relation between the lid and the locking pawl.

In this state, as shown in FIG. 1, the locking pieces 24*a*, 24*b*, 24*c* and 24*d* of the lid 24 are respectively inserted into the through holes 31*c*, 31*d*, 31*a* and 31*b*. As a result, the lower surface of the lid 24 comes into contact with the locking pawl 29 as shown in FIG. 7A, thereby causing the locking pawl 29 to be flexed downwardly.

In this state, the locking piece 24*a* of the lid 24 is made to come into contact with the upper wall 28*c* of the sliding member 28*a* so that the sliding member 28*a* is allowed to be slid against the force of the spring exerted in the direction V (shown in FIG. 5B). At the lid-mounted position x, the locking pawl 29 is removed from the lower surface of the lid 24 and comes into contact with the end 242 as shown in FIG. 7B.

In this state, the locking pieces 24*c* and 24*d* of the lid 24 are respectively engaged with the through holes 31*a* and 31*b* of the case 26. Hence, the lid 24 can be removed only if the lid 24 is slid in the direction V.

Figure 5C:
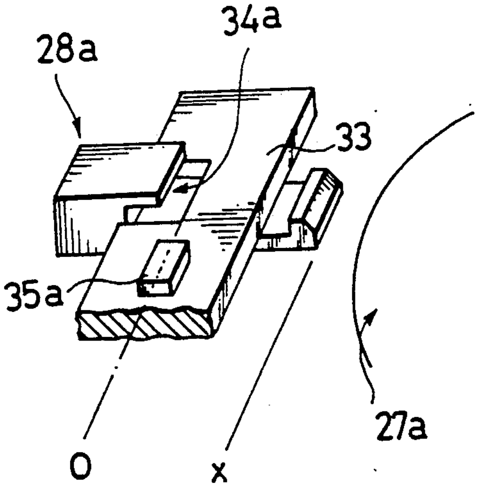

In the state that as shown in FIGS. 5B, 6B and 7B, the lid 24 can be removed from the case 26 only if the lid 24 is slid in the direction V, as shown in FIG. 5C, the concave 28*e* of the sliding member 28*a* is disengaged from the cut-away portion 34*a* of the switching member 33, resulting in allowing the switching member 33 to be slid.

Figure 6C:
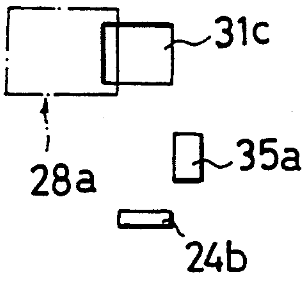

In this state, as shown in FIG. 6C, the locking piece 24*b* of the lid 24 is located off the sliding member 28*a* farther than the projection 35*a* of the switching member 33.

Figure 5D:
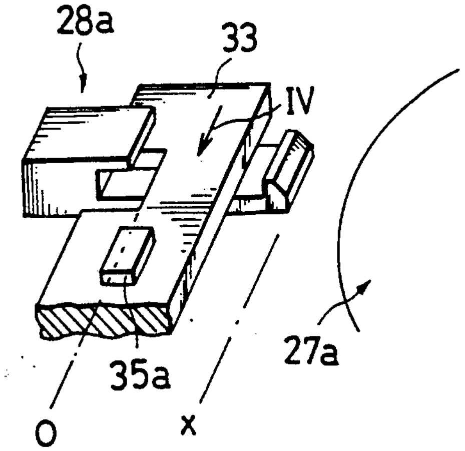
Figure 6D:
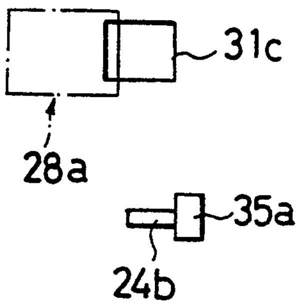

Then, as shown in FIG. 5D, the switching member 33 is made to be slid in the direction IV. As a result, the locking piece 24*b* comes into contact with the projection 35*a* as shown in FIG. 6D so that the lid 24 is disallowed to be slid in the direction V (shown in FIG. 5B). Hence, the lid 24 is mounted on the case 26 with the locking pieces 24*c* and 24*d* being respectively fitted into the through holes 31*a* and 31*b*.

The above description concerns with the main battery housing portion A. However, the foregoing description is true to the locking pieces formed on the lid of the back-up battery housing portion B, the through holes formed on the case, and the sliding members for sensing the mounted battery of the back-up battery housing portion B.

When, therefore, either one of the main battery housing portion A and the back-up battery housing portion B is in the state as shown in FIG. 6D, that is, the battery is mounted on either one of the housing portions A and B and the lid is mounted on the case, the sliding member of the other battery holding portion is allowed to be slid to the battery-empty position y as shown in FIG. 5A. It results in allowing the lid to be removed from the case and then the battery to be removed from the battery holding portion. Hence, it is possible to prevent the batteries mounted on both of the battery holding portions from being removed at a time.

The lid is locked on the case with the locking piece and the locking pawl so that the lid can be slid in the direction I shown in FIG. 1. Hence, the lid can be freely mounted or removed on the case. It results in achieving easier exchange than the foregoing known construction where the lid is mounted or removed by a coin or vis.

Figure 8:
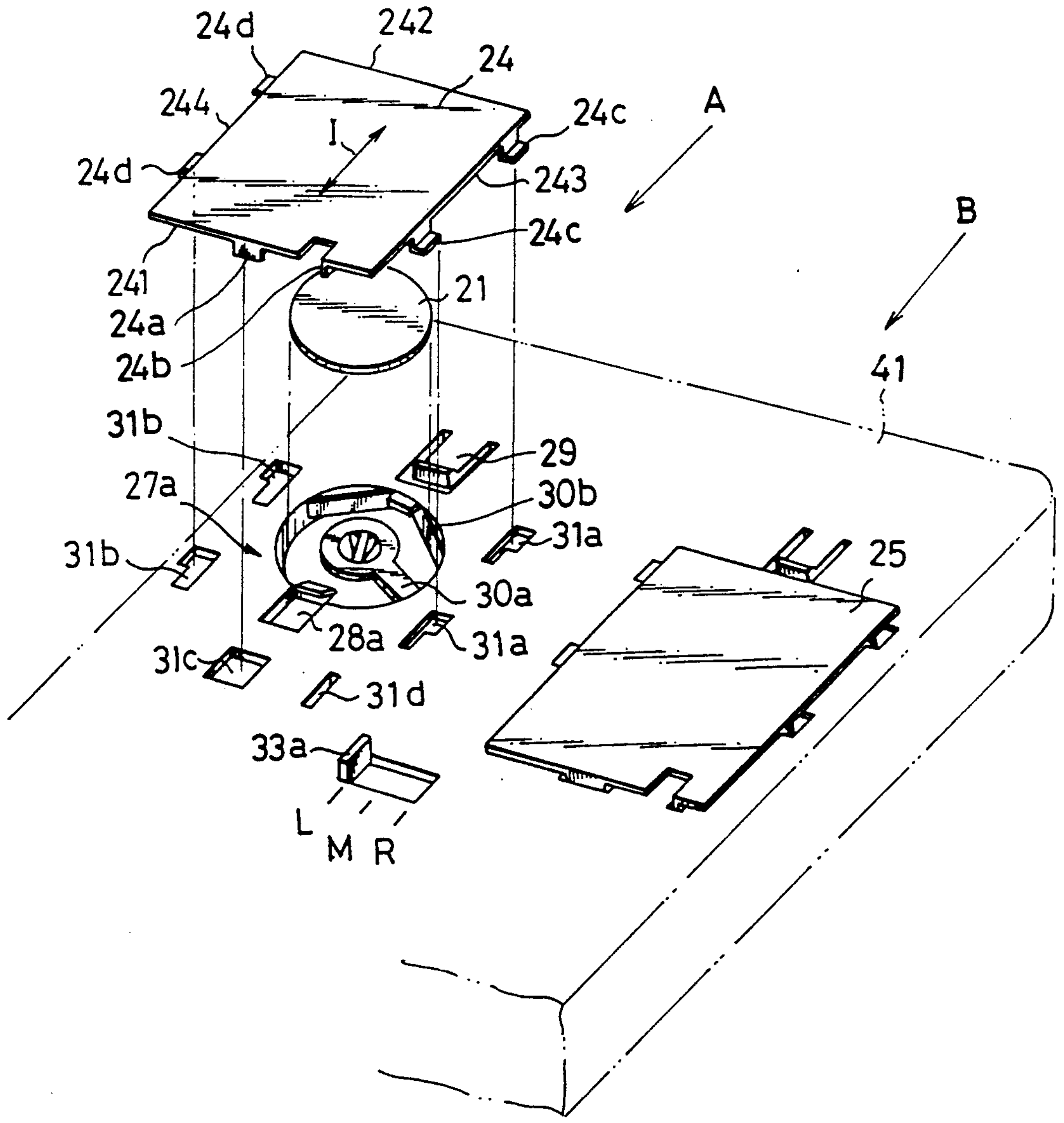

FIG. 8 is perspective view showing the construction of an electronic device which has the battery housing structure built-in.

In FIG. 8, the same reference numerals respectively denote the same elements as shown in FIG. 1. An electronic device 41 is, for example, a portable electronic device such as an electronic calculator and an electronic notebook. The electronic device 41 is driven by one or more batteries, and has the battery housing structure of the present invention built-in, as described above.

Many widely different embodiments of the present invention may be constructed without departing from the spirit and scope of the present invention. It should be understood that the present invention is not limited to the specific embodiments described in the specification, except as defined in the appended claims.

What is claimed is:

1. A battery housing structure including a holding portion for holding a battery and a lid for covering said holding portion, said holding portion being arranged on a case of an electronic device, comprising:

a sliding member for slidably moving between a first position and a second position, said first position corresponding to a position where a tip of said sliding member comes into contact with said battery when said battery is held on said holding portion and said second position corresponding to a position where the tip of said sliding member stops when said battery is not held on said holding portion; and a blocking member for preventing said lid from being mounted on said case when the tip of said sliding member is located at the second position.

2. A battery housing structure according to claim 1, wherein said lid includes two or more locking members capable of being inserted into through holes provided on said case, and said lid is formed to slidably move between the first position and a third position, said third position being located between the first and second position and where the tip of said sliding member comes into contact with said battery when said battery is held on said holding portion, said locking members are formed to be locked in said through holes when said lid is located at the first position and to be released from said through holes when said lid is located at the third position.

3. A battery housing structure according to claim 1, wherein said holding portion includes two terminals respectively connected to terminals of said battery when said battery is held on said holding portion.

4. A battery housing structure having first and second battery housing structure unit, each of said units including a holding portion for holding a battery and a lid for covering said holding portion, said holding portion being arranged on a case of an electronic device, comprising:

a sliding member for slidably moving between a first position and a second position, said first position corresponding to a position where a tip of said sliding member comes into contact with said battery when said battery is held on said holding portion and said second position corresponding to a position where the tip of said sliding member stops when said battery is not held on said holding portion;

a blocking member for preventing said lid from being mounted on said case when the tip of said sliding member is located at the second position; and a switching member for slidably moving in the direction perpendicular to both of said sliding members in said first and second units, said switching member being formed to block a removal of said lid of said first unit when the said battery is not held in said second holding portion in said second unit.

5. A battery housing structure according to claim 4, wherein each of said lids respectively included in said first and second battery housing structure unit comprises two or more locking members capable of being inserted into through holes provided on said case, and each of said lids is formed to slidably move between the first position and a third position, said third position being located between the first and second position and where the tip of said sliding member comes into contact with said battery when said battery is held on said holding portion, said locking members are formed to be locked in said through holes when said lid is located at the first position and to be released from said through holes when said lid is located at the third position.

6. A battery housing structure according to claim 4, wherein said holding portion includes two terminals respectively connected to terminals of said battery when said battery is held on said holding portion.

7. A battery housing structure according to claim 4, wherein said switching member includes a switching knob for selecting the first and second positions.

8. An electronic device which is driven by a battery. comprising:

a battery housing structure having first and second battery housing structure unit, each of said units including a holding portion for holding said battery and a lid for covering said holding portion, said holding portion being arranged on a case of an electronic device, including, a sliding member for slidably moving between a first position and a second position, said first position corresponding to a position where a tip of said sliding member comes into contact with said battery when said battery is held on said holding portion and said second position corresponding to a position where the tip of said sliding member stops when said battery is not held on said holding portion, a blocking member for preventing said lid from being mounted on said case when the tip of said sliding member is located at the second position, and a switching member for slidably moving in the direction perpendicular to both of said sliding members in said first and second units, said switching member being formed to block a removal of said lid of said first unit when the said battery is not held in said second holding portion in said second unit.

9. An electronic device according to claim 8, wherein each of said lids respectively included in said first and second battery housing structure unit comprises two or more locking members capable of being inserted into through holes provided on said case, and each of said lids is formed to slidably move between the first position and a third position, said third position being located between the first and second position and where the tip of said sliding member comes into contact with said battery when said battery is held on said holding portion, said locking members are formed to be locked in said through holes when said lid is located at the first position and to be released from said through holes when said lid is located at the third position.

* * * * *